(12) United States Patent
Sudolcan

(10) Patent No.: US 7,092,790 B2
(45) Date of Patent: Aug. 15, 2006

(54) INTELLIGENT VOLUMETRIC MODULE FOR DRINK DISPENSER

(75) Inventor: David C. Sudolcan, Atascosa, TX (US)

(73) Assignee: Lancer Partnership Ltd., San Antonio, TX (US)

( * ) Notice: Subject to any disclaimer, the term of this patent is extended or adjusted under 35 U.S.C. 154(b) by 0 days.

(21) Appl. No.: 10/460,635

(22) Filed: Jun. 12, 2003

(65) Prior Publication Data

US 2003/0216832 A1 Nov. 20, 2003

Related U.S. Application Data

(62) Division of application No. 09/908,405, filed on Jul. 18, 2001.

(51) Int. Cl.
*G06F 17/00* (2006.01)

(52) U.S. Cl. ............... 700/239; 700/11; 700/24; 710/29; 710/32; 710/36; 340/3.5; 340/3.53; 340/825.2; 340/825.21; 340/825.52

(58) Field of Classification Search ........... 700/239, 700/240; 710/29, 32, 36, 58–60; 340/3.4, 340/3.41, 3.42–3.44, 3.5, 3.53, 825.2, 825.21, 340/825.52, 825.31, 5.91, 5.92, 286.01, 286.02; 347/84–86

See application file for complete search history.

(56) References Cited

U.S. PATENT DOCUMENTS

| | | | | |
|---|---|---|---|---|
| 5,044,521 | A | * | 9/1991 | Peckels ................. 222/23 |
| 5,507,411 | A | * | 4/1996 | Peckels ................. 222/1 |
| 5,629,863 | A | * | 5/1997 | Palozzi et al. ........... 700/285 |
| 5,706,273 | A | * | 1/1998 | Guerreri ............... 700/283 |
| 5,928,345 | A | * | 7/1999 | Tetzlaff et al. ........... 710/107 |
| 6,089,409 | A | * | 7/2000 | Hart et al. ............. 222/146.5 |
| 6,264,069 | B1 | * | 7/2001 | Hughes et al. ........... 222/129.1 |
| 6,421,583 | B1 | * | 7/2002 | Sudolcan et al. ........ 700/239 |
| 6,547,100 | B1 | * | 4/2003 | Phillips et al. .......... 222/129.1 |

* cited by examiner

*Primary Examiner*—Kathy Matecki
*Assistant Examiner*—Jeffrey A. Shapiro
(74) *Attorney, Agent, or Firm*—Christopher L. Makay

(57) ABSTRACT

An intelligent volumetric module for use in metering pressurized syrup to a drink dispenser machine comprises a solenoid driven metering system for controlling liquid flows from a pressurized syrup container and a controller for controlling operation of said solenoid driven metering system according to uniquely addressed instructions received from the drink dispenser's system controller. The controller comprises a self-addressing capability, wherein serial communication to all but one non-addressed volumetric module is disrupted while a first address is assigned to that one module. Communication is the enabled along a serial bus to a next non-addressed module, to which a second address is assigned. The process continues until each volumetric module is assigned a unique address and connected to the serial communication bus.

2 Claims, 3 Drawing Sheets

INTELLIGENT VOLUMETRIC MODULE FOR DRINK DISPENSER

This application is a division of application Ser. No. 09/908,405, filed Jul. 18, 2001.

FIELD OF THE INVENTION

The present invention relates to drink dispenser equipment. More particularly, the invention relates to an improved volumetric module whereby remotely located pressurized syrup containers may be interfaced with a drink dispenser system controller with minimum wiring requirements and without necessity for individualized addressing.

BACKGROUND OF THE INVENTION

Volumetric syrup modules are well known for the controlled metering of pressurized drink syrups. These modules are typically located with the pressurized syrups apart from the customer interface unit. Because each module typically contains two solenoid coils capable of drawing in excess of one ampere current, a large inductive load is required in their operation. As a result, heavy gauge wiring is required in the connection of each module to the customer interface unit. Unfortunately, the resulting wire bundle is expensive and requires a great deal of space. Further, due to corrosion and the like, the bundle has been identified as a high failure component for the typical drink dispenser.

As a result of this deficiency, it is an object of the present invention to improve over the prior art by providing a control architecture wherein a minimum number of wires is required to connect the system controller of the drink dispenser with the volumetric modules. Because the syrup environment is typically harsh, however, it is a further object of the present invention to provide such an architecture wherein no external switches are required for communication addressing and the like. Finally, in an effort to minimize maintenance costs, it is an object of the present invention to provide such a system wherein each volumetric module is identical and fully interchangeable.

SUMMARY OF THE INVENTION

In accordance with the foregoing objects, the present invention—an intelligent volumetric module for use in metering pressurized syrup to a drink dispenser machine—generally comprises a solenoid driven metering system for controlling liquid flows from a pressurized syrup container and a controller for controlling operation of said solenoid driven metering system according to uniquely addressed instructions received from the drink dispenser's system controller. The controller comprises a self-addressing capability, wherein serial communication to all but one non-addressed volumetric module is disrupted while a first address is assigned to that one module. Communication is the enabled along a serial bus to a next non-addressed module, to which a second address is assigned. The process continues until each volumetric module is assigned a unique address and connected to the serial communication bus.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
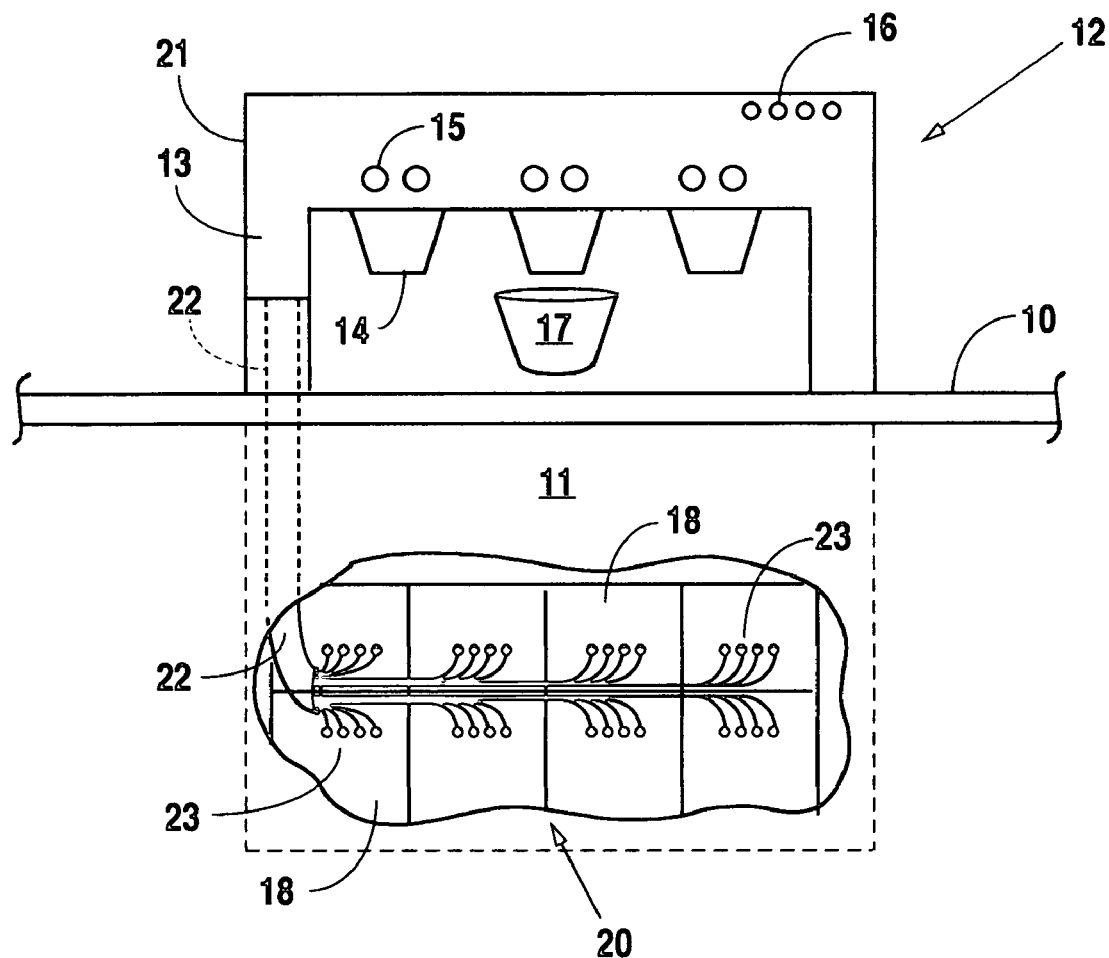
FIG. 1 shows, in a front plan view, a typical drink dispenser with volumetric syrup modules deployed according to a previously known implementation.

As shown particularly in FIG. 1, a typical drink dispenser 12 generally comprises a user interface unit 13, resting atop a counter 10, and a plurality of volumetric syrup modules 18, usually disposed beneath the counter 10 behind a cabinet facing 11. The user interface unit 13 includes a plurality of dispenser spouts 14 for pouring drink products into a cup 17. Flow control buttons 15 and status indicator lights 16 are also usually provided on a front panel of the user interface unit 13. In order to facilitate maintenance and to reduce cabling requirements, the system controller 21 for the drink dispenser 12 is typically also housed within the user interface unit 13. Because, on the other hand, the pressurized syrup containers 20, as are well known to those of ordinary skill in the art, generally require more space than is typically available above the counter 10, the pressurized syrup containers 20 and their associated volumetric syrup modules 18 are most often located apart from the user interface unit 13 and connected therewith by appropriate fluid conduits and a cable bundle 22.

In a typical drink dispenser 12, as many as eighteen volumetric syrup modules 18 may be required to control syrup flows to the dispenser spouts 14. In the previously known implementation as depicted I FIG. 1, a total of seventy-two wires, each of eighteen gauge or larger was needed in the cable bundle 22 to control operation of the thirty-six required solenoid valves 19. As a consequence, the resulting large cable bundle 22 has heretofore plagued the industry as expensive, unreliable and overly consuming of space. For these reasons, the Applicant has undertaken to develop the present invention wherein a minimum number of wires is required to interconnect the user interface unit 13 and the volumetric syrup modules 18.

Figure 2:
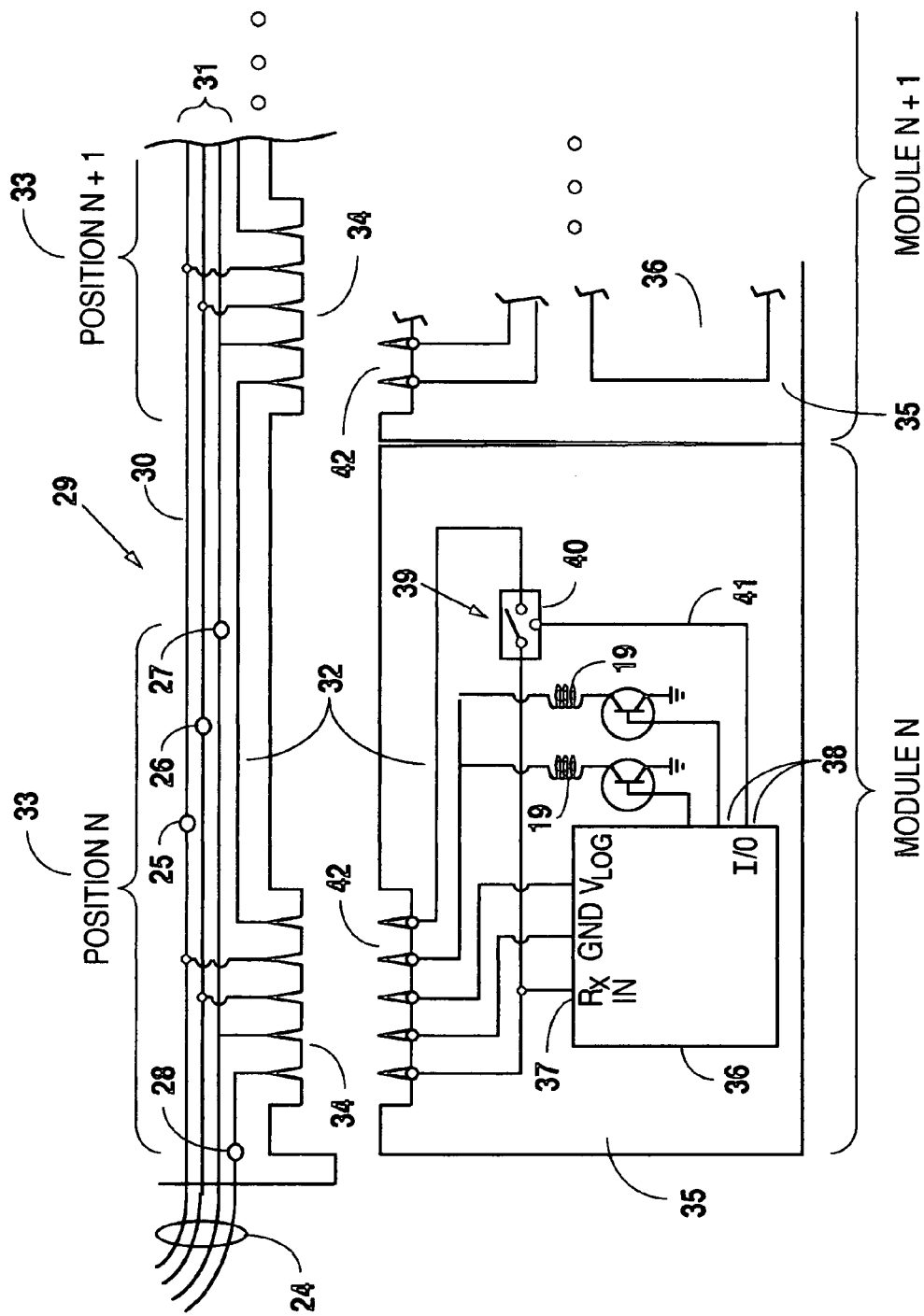
FIG. 2 shows, in schematic block diagram, an intelligent volumetric module according to the present invention.

As shown in FIG. 2, the present invention comprises a four-wire cable 24 for providing the interconnection between the user interface unit 13 and the volumetric syrup modules 18. According to this implementation, a single line each is dedicated for providing solenoid power 25, logic power 26, common ground 27 and serial data transmission (TX) 28. This four-wire cable 24 interfaces to a back plane 29 beneath the counter 10 having multiple positions 33 for receiving a plurality of intelligent volumetric modules 35, as will be better understood further herein. As represented in FIG. 2, the back plane 29 comprises a printed wiring assembly (PWA) bus 30. This PWA bus 30 comprises a pass through channel 31 for providing solenoid power 25, logic power 26 and common ground 27 to each of the positions 33 on a continuous basis. As will be better understood further herein, the PWA bus 30 also comprises a separate serial data channel 32 whereby each position 33 may be selectively connected in serial data communication with the user interface unit 13 according to the address status of each intelligent volumetric module 35.

In addition to the components known to those of ordinary skill in the art to reside in a typical volumetric syrup module 18, each intelligent volumetric module 35 of the present invention comprises a micro-controller 36, for interpretation of serial communications from the system controller 21 of the user interface unit 13, and a serial data jumper 39 for selectively completing the serial data channel 32 between the various positions of the back plane 29. In order to receive serial communications from the system controller 21, the micro-controller 36 should comprise a receive (RX) input 37 and, in order to selectively energize the solenoid coils 19 as well as to control the serial data jumper 39, the micro-controller 36 should have a plurality of input/output (I/O) ports 38. Although those of ordinary skill in the art will readily recognize many alternatives, Applicant has found that a Philips Semiconductors device number 80C51 8-bit micro-controller, which is commercially available from the Philips Electronics North America Corporation of Sunnyvale, Calif., is one such suitable micro-controller.

As shown in the Figure, the serial data jumper 39 generally comprises a single pole single throw (SPST) switch 40 with an interface 41 to one of the I/O ports 38 of the micro-controller 36. As will be better understood further herein, the micro-controller 36 may thereby control the position of the SPST switch 40 according to a signal on the I/O port 38. In this manner, after connection of the module's male connector 42 with the back plane's female connector 34, the micro-controller 36 may control the completion of the serial data transmission line 28 between the various positions 33 of the back plane 29.

Figure 3:
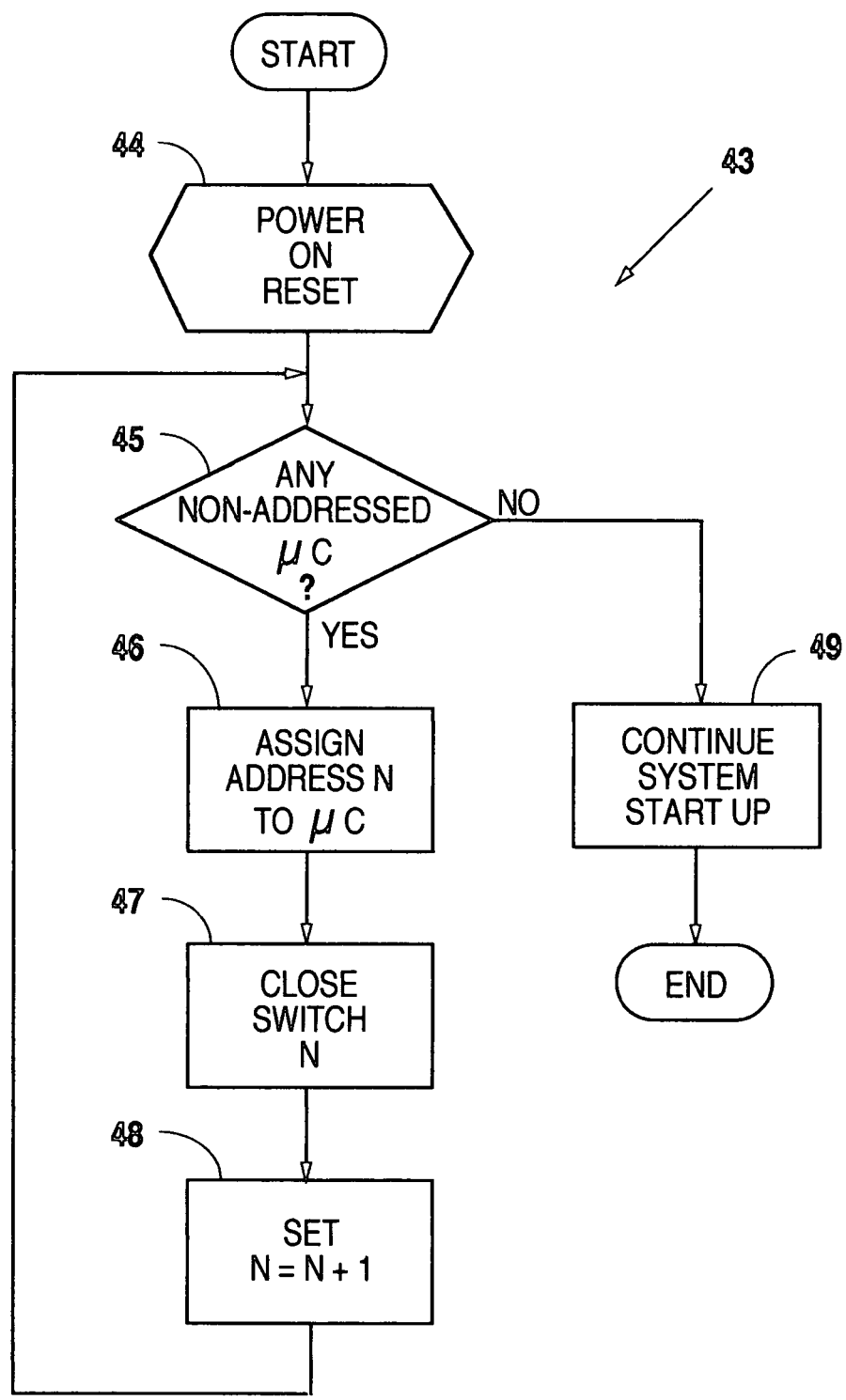
FIG. 3 shows, in flow chart, the unique communication addressing scheme as implemented in the intelligent volumetric module of FIG. 2.

Referring now to FIG. 3, the unique address assignment process 43 of the present invention is detailed. Upon initial power up, a power on reset 44 is performed in both the system controller 21 and within each intelligent volumetric module 35. During the power on reset 44, each serial data jumper switch 40 is placed in the open position and, in the system controller 21, a next address variable N is set to "1." Upon completion of the power on reset 44, the system controller 21 begins the process of assigning addresses to each micro-controller 36. This function is performed by repeatedly determining whether there exists a non-addressed micro-controller 45 and, if so, assigning the address N to that micro-controller 46. After the assignment is made, the system controller 21 sends a command through the serial data transmission line 28 to the just addressed micro-controller 36 instructing it to close its SPST switch 47. The system controller 21 then increments the variable N by one 48. This process is repeated until, based upon prior knowledge of the number of intelligent volumetric modules 35, the system controller 21 determines that there exists no non-addressed micro-controller 36. At this point the system startup is continued 49 and the drink dispenser 12 is placed in service.

Although those of ordinary skill in the art will recognize that other addressing schemes may be implemented, such as DIP-switch addressing, the present Applicant has found that the syrup environment is generally too harsh for the use of such switches. In addition, the present invention has the advantage of completely interchangeable volumetric modules 35. These features serve to reduce service costs and to generally increase system reliability.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that an additional line may be added to the four-wire cable 24 to provide two-way communication between the system controller 21 and the intelligent volumetric modules 35. In this manner status information from each intelligent volumetric module 35 may be provided to the system controller 21, thereby further improving system reliability at very little additional cost. In any case, because the scope of the present invention is much broader than any particular embodiment, the foregoing detailed description should not be construed as a limitation of the scope of the present invention, which is limited only by the claims appended hereto.

What is claimed is:

1. A method for assigning serial communication addresses to a plurality of volumetric modules, comprising:

disrupting serial communication to all but one non-addressed volumetric module by opening a switch in each volumetric module, each said switch being adapted to disrupt serial communication beyond its volumetric module;

assigning a first address to said one non-addressed volumetric module;

enabling serial communication to a next non-addressed volumetric module by closing the switch corresponding to the module addressed in said assigning a first address step, thereby providing serial communication from the module addressed in said assigning a first address step to said next non-addressed module; and assigning a second address to said next non-addressed volumetric module.

2. A method for assigning serial communication addresses to volumetric modules, comprising:

providing a volumetric module including a serial data jumper;

moving the serial data jumper to a first position that inhibits flow of serial communication data beyond the volumetric module;

assigning an address to the volumetric module;

moving the serial data jumper to a second position that permits flow of serial communication data from the volumetric module to a second volumetric module; and assigning an address to the second volumetric module.

* * * * *